(12) United States Patent
Oesterreicher et al.

(10) Patent No.: US 7,912,954 B1
(45) Date of Patent: Mar. 22, 2011

(54) SYSTEM AND METHOD FOR DIGITAL MEDIA SERVER LOAD BALANCING

(76) Inventors: Richard T. Oesterreicher, Naples, FL (US); Craig Murphy, Kirkland, WA (US)

( * ) Notice: Subject to any disclaimer, the term of this patent is extended or adjusted under 35 U.S.C. 154(b) by 1193 days.

(21) Appl. No.: 10/609,426

(22) Filed: Jun. 27, 2003

(51) Int. Cl.
*G06F 15/173* (2006.01)

(52) U.S. Cl. .................................................... 709/226

(58) Field of Classification Search .......... 709/217–219, 709/227–229, 226; 714/4–6
See application file for complete search history.

(56) References Cited

U.S. PATENT DOCUMENTS

| | | | |
|---|---|---|---|
| 5,353,430 A | 10/1994 | Lautzenheiser | |
| 5,561,823 A | 10/1996 | Anderson | |
| 5,586,291 A | 12/1996 | Lasker et al. | |
| 5,592,612 A | 1/1997 | Birk | |
| 5,761,458 A | 6/1998 | Young et al. | |
| 5,774,668 A | 6/1998 | Choquier et al. | |
| 5,809,239 A | 9/1998 | Dan et al. | |
| 5,996,025 A | 11/1999 | Day et al. | |
| 6,070,191 A * | 5/2000 | Narendran et al. ........... 709/226 |
| 6,092,178 A * | 7/2000 | Jindal et al. ..................... 712/27 |
| 6,148,368 A | 11/2000 | DeKoning | |
| 6,182,138 B1 | 1/2001 | Aoki | |
| 6,185,598 B1 * | 2/2001 | Farber et al. ................... 709/200 |
| 6,185,619 B1 * | 2/2001 | Joffe et al. ..................... 709/229 |
| 6,189,080 B1 | 2/2001 | Ofer | |
| 6,223,206 B1 | 4/2001 | Dan et al. | |
| 6,327,614 B1 | 12/2001 | Asano et al. | |
| 6,370,584 B1 * | 4/2002 | Bestavros et al. ............. 709/238 |
| 6,377,996 B1 | 4/2002 | Lumelsky et al. | |
| 6,466,978 B1 * | 10/2002 | Mukherjee et al. ........... 709/225 |
| 6,535,518 B1 | 3/2003 | Hu et al. | |
| 6,587,921 B2 | 7/2003 | Chiu et al. | |
| 6,665,704 B1 | 12/2003 | Singh | |
| 6,718,361 B1 * | 4/2004 | Basani et al. ................. 709/201 |
| 6,728,850 B2 | 4/2004 | Gotoh et al. | |
| 6,748,447 B1 * | 6/2004 | Basani et al. ................. 709/244 |
| 6,760,763 B2 * | 7/2004 | Jennings et al. .............. 709/224 |

(Continued)

FOREIGN PATENT DOCUMENTS

GB 2343348 3/2000

(Continued)

OTHER PUBLICATIONS

Bestavros, et al. "Distributed Packet Rewriting and its Application to Scalable Server Architectures" IEEE, Oct. 1998.*

(Continued)

*Primary Examiner* — Benjamin R Bruckart
(74) *Attorney, Agent, or Firm* — Woodcock Washburn LLP

(57) ABSTRACT

A system and method for load balancing a plurality of servers is disclosed. In a preferred embodiment, a plurality of servers in a video-on-demand or other multi-server system are divided into one or more load-balancing groups. Each server preferably maintains state information concerning other servers in its load-balancing group including information concerning content maintained and served by each server in the group. Changes in a server's content status or other state information are preferably proactively delivered to other servers in the group. When a content request is received by any server in a load-balancing group, it evaluates the request in accordance with a specified algorithm to determine whether it should deliver the requested content itself or redirect the request to another server in its group. In a preferred embodiment, this determination is a function of information in the server's state table.

36 Claims, 17 Drawing Sheets

U.S. PATENT DOCUMENTS

| | | | |
|---|---|---|---|
| 6,799,214 B1* | 9/2004 | Li | 709/226 |
| 6,862,624 B2* | 3/2005 | Colby et al. | 709/226 |
| 6,986,018 B2 | 1/2006 | O'Rourke et al. | |
| 7,043,558 B2 | 5/2006 | Yoshida et al. | |
| 7,080,158 B1 | 7/2006 | Squire | 709/245 |
| 7,099,915 B1* | 8/2006 | Tenereillo et al. | 709/203 |
| 7,213,062 B1 | 5/2007 | Raciborski et al. | |
| 7,233,978 B2* | 6/2007 | Overton et al. | 709/217 |
| 7,398,312 B1* | 7/2008 | Guo et al. | 709/226 |
| 7,403,993 B2 | 7/2008 | John et al. | |
| 7,500,055 B1 | 3/2009 | Oesterreicher et al. | |
| 2002/0002622 A1* | 1/2002 | Vange et al. | 709/245 |
| 2002/0010783 A1* | 1/2002 | Primak et al. | 709/228 |
| 2002/0040402 A1* | 4/2002 | Levy-Abegnoli et al. | 709/229 |
| 2002/0059371 A1* | 5/2002 | Jamail et al. | 709/203 |
| 2002/0116481 A1* | 8/2002 | Lee | 709/220 |
| 2002/0120743 A1* | 8/2002 | Shabtay et al. | 709/226 |
| 2002/0161890 A1* | 10/2002 | Chen | 709/226 |
| 2002/0169827 A1 | 11/2002 | Ulrich et al. | |
| 2003/0055910 A1 | 3/2003 | Amini et al. | |
| 2003/0115346 A1 | 6/2003 | McHenry et al. | 709/229 |
| 2003/0158908 A1* | 8/2003 | Jacobs et al. | 709/214 |
| 2003/0195984 A1* | 10/2003 | Zisapel et al. | 709/238 |
| 2004/0010588 A1* | 1/2004 | Slater et al. | 709/224 |
| 2004/0024941 A1 | 2/2004 | Olarig et al. | |
| 2004/0093288 A1 | 5/2004 | Strothmann et al. | |
| 2004/0125133 A1 | 7/2004 | Pea et al. | |
| 2007/0124476 A1 | 5/2007 | Oesterreicher et al. | |

FOREIGN PATENT DOCUMENTS

| | | |
|---|---|---|
| GB | 2342263 | 4/2000 |

OTHER PUBLICATIONS

Aversa et al. "Load balancing a Cluster of Web Servers", Boston University, 2000.*

Katz et al. "A Scalable HTTP Server: The NCSA Prototype", First International WWW conference, May 1994.*

Brisco, T; "DNS Support for Load Balancing" RFC 1794; Apr. 1995.*

Cisco Systems, Inc., "Load Balancing—A Multifaceted Solution for Improving Server Availability," <http://www.cisco.com/warp/public/cc/pd/_cxsr/400/tech/lobal_wp.pdf> (1998).

United States Patent and Trademark Office: Non-Final Office Action dated Jun. 27, 2007, U.S. Appl. No. 11/468,613.

United States Patent and Trademark Office: Final Office Action dated Oct. 5, 2007, U.S. Appl. No. 11/468,613.

United States Patent and Trademark Office: Non-Final Office Action dated May 23, 2008, U.S. Appl. No. 11/468,613.

United States Patent and Trademark Office: Final Office Action dated Sep. 2, 2008, U.S. Appl. No. 11/468,613.

United States Patent and Trademark Office: Non-Final Office Action dated Feb. 10, 2009, U.S. Appl. No. 11/468,613.

United States Patent and Trademark Office: Final Office Action dated Jul. 17, 2009, U.S. Appl. No. 11/468,613.

U.S. Appl. No. 11/469,184 filed Aug. 31, 2000, Oesterriecher et al.

United States Patent and Trademark Office: Non-Final Office Action dated Aug. 4, 2005, U.S. Appl. No. 10/609,433, filed Jun. 27, 2003.

United States Patent and Trademark Office: Final Office Action dated Dec. 8, 2005, U.S. Appl. No. 10/609,433, filed Jun. 27, 2003.

United States Patent and Trademark Office: Non-Final Office Action dated Apr. 25, 2006, U.S. Appl. No. 10/609,433, filed Jun. 27, 2003.

United States Patent and Trademark Office: Final Office Action dated Nov. 14, 2006, U.S. Appl. No. 10/609,433, filed Jun. 27, 2003.

United States Patent and Trademark Office: Non-Final Office Action dated Mar. 27, 2007, U.S. Appl. No. 10/609,433, filed Jun. 27, 2003.

United States Patent and Trademark Office: Final Office Action dated Aug. 7, 2007, U.S. Appl. No. 10/609,433, filed Jun. 27, 2003.

United States Patent and Trademark Office: Notice of Allowance dated Jan. 31, 2008, U.S. Appl. No. 10/609,433, filed Jun. 27, 2003.

United States Patent and Trademark Office: Notice of Allowance dated Oct. 21, 2008, U.S. Appl. No. 10/609,433, filed Jun. 27, 2003.

* cited by examiner

| Server Name | SLB Para1 | SLB Para2 | SLB ParaN |
|---|---|---|---|
| Server A | (data) | (data) | (data) |
| Server B | (data) | (data) | (data) |
| Server C | (data) | (data) | (data) |

310

320

| Server Name | SLB Para1 | SLB Para2 | SLB ParaN |
|---|---|---|---|
| Server D | (data) | (data) | (data) |
| Server E | (data) | (data) | (data) |
| Server F | (data) | (data) | (data) |

| Server | Status | Bandwidth | | Storage usage | Memory usage | CPU utilization | Asset 1 | Asset 2 | ... |
| | | incoming | outgoing | | | | | | |
| --- | --- | --- | --- | --- | --- | --- | --- | --- | --- |
| A | up | 47 | 275 | 34% | 37% | 40% | Dare Devil | Casablanca | |
| B | up | 24 | 145 | 25% | 22% | 27% | Casablanca | Spiderman | |
| C | up | 13 | 398 | 56% | 60% | 84% | Dare Devil | Spiderman | |

Fig. 8

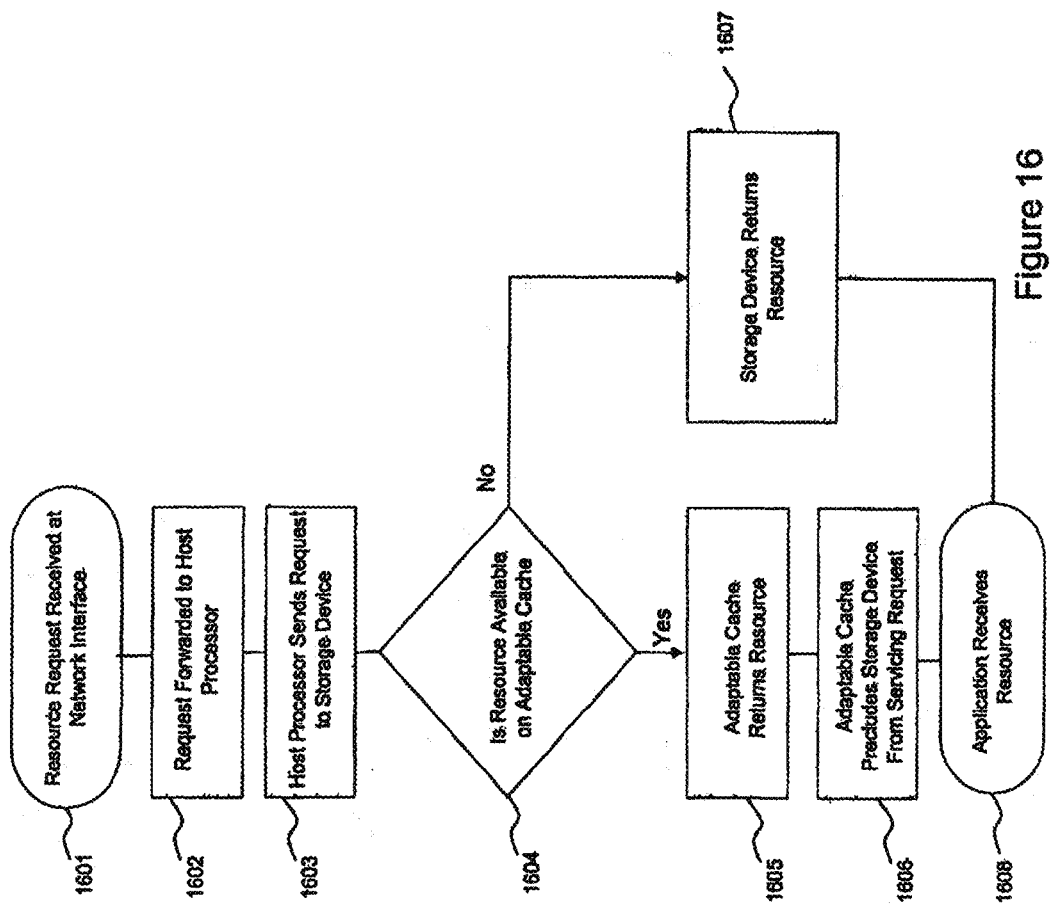

SYSTEM AND METHOD FOR DIGITAL MEDIA SERVER LOAD BALANCING

FIELD OF THE INVENTION

This invention relates to the field of load balancing.

BACKGROUND OF THE INVENTION

Load balancing techniques exist to ensure that individual servers in multi-server systems do not become overloaded and that services retain high availability. Load balancing is especially important where it is difficult to predict the number and timing of requests that will require processing.

Most current load-balancing schemes employ simple parameters to distribute network traffic across a group of servers. These parameters are usually limited to load amount (measured by the number of received requests), server "health" or hardware status (measured by processor temperature or functioning random access memory), and server availability.

One common load-balancing architecture employs a supervisor/subordinate approach. In this architecture, a control hierarchy of devices is established in a load-balancing domain. Each server in the system is assigned to a load-balancing group that includes a central device for monitoring the status of servers in its group. The supervisor acts as the gatekeeper for requests entering the group and delegates each request to an appropriate server based on the server's relative status to that of other servers in the group.

One negative aspect of this approach is that it introduces a single point of failure into the load-balancing process. If the supervisor goes offline for any reason, incoming requests cannot be serviced. To ameliorate this problem, some load-balancing schemes employ a secondary supervisor to handle requests when the primary supervisor is unavailable. A secondary supervisor, however, introduces extra cost in terms of physical equipment and administration.

One of the earliest forms of load balancing, popular in the early 1990's, is commonly referred to as domain name service (DNS) round robin. This load-balancing scheme, described in connection with FIG. 1, represents an extension of the standard domain name resolution technique primarily used by Internet Web servers experiencing extremely high usage.

As shown in FIG. 1, in step 110, a client requests data from a DNS server. In step 120, the domain name server resolves the requested server name into a series of server addresses. Each address in the series corresponds to a server belonging to a single load-balancing group. Each server in the group is provided with a copy of all data to be served, so that each server replicates data stored by every other server in the group.

In step 130, the domain name server assigns new requests by stepping through the list of server addresses, resulting in a crude and unpredictable load distribution for servers in the load-balancing group. Moreover, if the number of requests overloads the domain name server or if the server selected to service the request is at capacity, the service is ungracefully denied. In addition, if the selected server is at capacity, the new request routed by the domain name server may bring the server down.

Another major problem with DNS round robin is that the domain name server has no knowledge of server availability within the load-balancing group. If a server in the group is down, DNS round robin will nevertheless direct traffic to it.

In the mid 1990's, second generation load-balancing solutions were released. These solutions employed a dedicated load balance director (LBD), such as Cisco Systems' Local-Director. The director improves the DNS round robin load-balancing scheme by periodically testing the network port connections of each server in its group and directing responses to responsive servers. One such second generation solution is discussed in "Load Balancing: A Multifaceted Solution for Improving Server Availability" (1998 Cisco Systems, Inc., which is hereby incorporated by reference.

A third generation of load-balancing solutions included robust, dedicated load balancing and network management devices, such as the BIG-IP™ from F5 NETWORKS™ These devices improve server availability by monitoring server health via management protocols such as Simple Network Management Protocol (SNMP). Perhaps the biggest improvement of this generation is the ability to direct traffic based on requested content type instead of just load. For example, requests ending in ".http" are directed to Web servers, ".ftp" to file download servers, and ".ram" to REALNETWORKS'™ streaming servers. This feature enables network managers to create multiple load-balancing groups dedicated to specific content types.

Although the aforementioned load-balancing techniques are often adequate for managing multi-server systems that serve Web pages, file downloads, databases, and email, they still leave room for significant improvement. Moreover, such load-balancing schemes do not perform well in systems that serve broadcast-quality digital content, which is both time sensitive and bandwidth intensive.

SUMMARY OF THE INVENTION

A system and method for load balancing a plurality of servers is disclosed. In a preferred embodiment, a plurality of servers in a video-on-demand or other multi-server system are divided into one or more load-balancing groups. Each server preferably maintains state information concerning other servers in its load-balancing group including information concerning content maintained and served by each server in the group. Changes in a server's content status or other state information are preferably proactively delivered to other servers in the group. Thus, for example, to maintain a current inventory of assets within a load-balancing group, each server provides notification to other servers in its group when an asset that it maintains is added, removed, or modified.

When a content request is received by any server in a load-balancing group, it evaluates the request in accordance with a specified algorithm to determine whether it should deliver the requested content itself or redirect the request to another server in its group. In a preferred embodiment, this determination is a function of information in the server's state table.

The present system and method provide several benefits. First, because they employ a peer-based balancing methodology in which each server can respond to or redirect client requests, the present system and method do not present a single point of failure, as do those schemes that utilize a single load-balancing director. Second, because the present system and method proactively distribute state information within each group, each server is made aware of the current status of every server in its group prior to a client request. Consequently, when a request for content is received, it may be rapidly directed to the appropriate server without waiting for polled status results from other servers in the group. Moreover, in some preferred embodiments, the present system and method defines parameters concerning the capability of each server such as extended memory, inline adaptable cache, or other unique storage attributes, thus permitting sophisticated load-balancing algorithms that take account of multiple factors that may affect the ultimate ability of the system to most efficiently respond to client requests. Furthermore, in some preferred embodiments, the present system and method considers other media asset parameters such as whether an asset is a "new release" to help anticipate demand for the asset.

In one aspect, the present invention is directed to a method for selecting a server from a plurality of servers to service a request for content, comprising: designating a director from the plurality of servers to receive the request, wherein the designation is made on a request-by-request basis; and allocating to the director the task of selecting a server to service the request from the plurality of servers, said server having stored thereon the content, the director using a state table comprising parametric information for servers in the plurality of servers, wherein said parametric information comprises information identifying assets maintained on each server in the plurality of servers.

In another aspect of the present invention, the step of designating comprises designating the director in a round-robin fashion.

In another aspect of the present invention, the step of designating comprises designating the director on the basis of lowest load.

In another aspect of the present invention, the step of selecting further comprises selecting the director if the content is present on the director.

In another aspect of the present invention, said parametric information further comprises functional state and current load of each server.

In another aspect of the present invention, said parametric information further comprises whether each server comprises extended memory.

In another aspect of the present invention, said parametric information further comprises whether each server comprises an inline adaptable cache.

In another aspect of the present invention, said parametric information further comprises whether each asset is a new release.

In another aspect of the present invention, the method further comprises rejecting the request if the content is not present on any of the plurality of servers.

In another aspect of the present invention, the method further comprises forwarding the request to the selected server.

In another aspect of the present invention, The method further comprises redirecting the request to the selected server.

In another aspect of the present invention, the step of selecting further comprises: calculating a load factor for each server in the plurality of servers having the content; identifying as available servers one or more servers whose parameters are below threshold limits; selecting a server from the available servers having the lowest load factor; and otherwise selecting a server having the lowest load factor from the plurality of servers having the content.

In another aspect, the present invention is directed to a server for directing a request for content among a plurality of servers comprising: a state table comprising parametric information for each server in the plurality of servers, said parametric information comprising information identifying assets maintained on the plurality of servers; and a communication component for sending changes the state table to the plurality of servers.

In another aspect of the present invention, the server is a member of a load-balancing group, and the communication component sends changes to servers in the load-balancing group.

In another aspect of the present invention, the server further comprises a redirection means for acknowledging the client request and identifying one of the plurality of servers where the requested asset is stored.

In another aspect of the present invention, the server further comprises a forwarding means for sending the client request to one of the plurality of servers where the requested asset is stored.

In another aspect of the present invention, said parametric information further comprises functional state and current load of each server.

In another aspect of the present invention, said parametric information further comprises whether each server comprises extended memory.

In another aspect of the present invention, said parametric information further comprises whether each server comprises an inline adaptable cache.

In another aspect of the present invention, said parametric information further comprises whether each asset is a new release.

BRIEF DESCRIPTION OF THE DRAWINGS

FIG. 8 is a diagram illustrating an exemplary state table in a preferred embodiment of the present system and method.

FIG. 16 is a flow diagram illustrating the operation of the preferred embodiment of FIG. 15.

DESCRIPTION OF THE PREFERRED EMBODIMENTS

Figure 1:
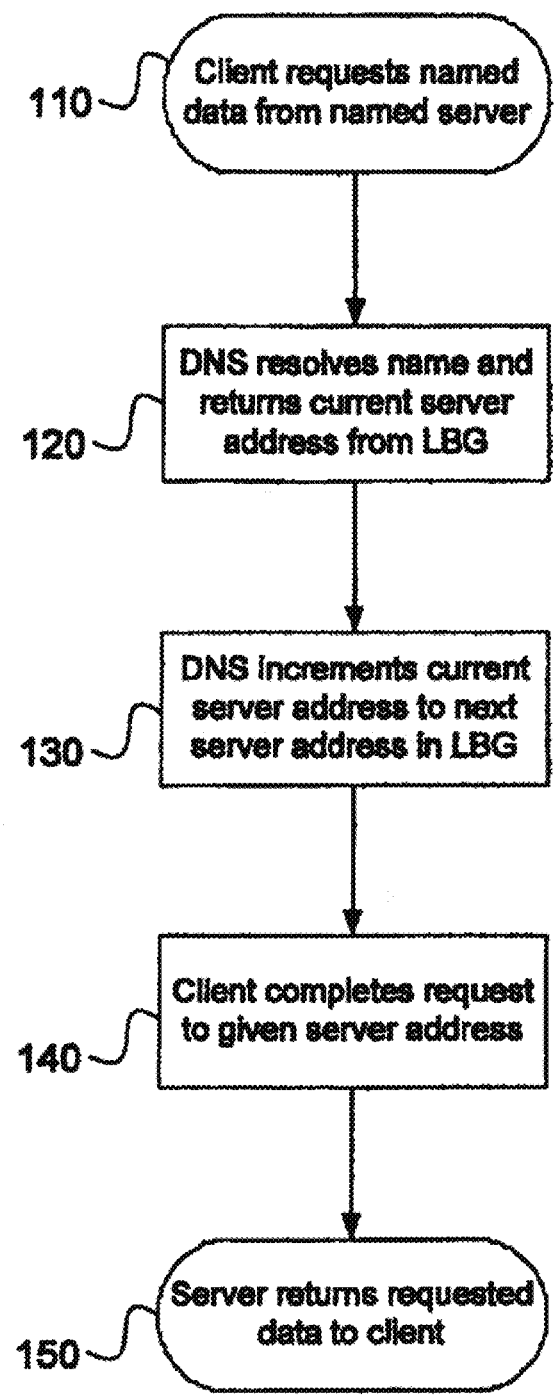
FIG. 1 is a flowchart illustrating a DNS round robin load-balancing scheme in the prior art.
Figures 2, 3:
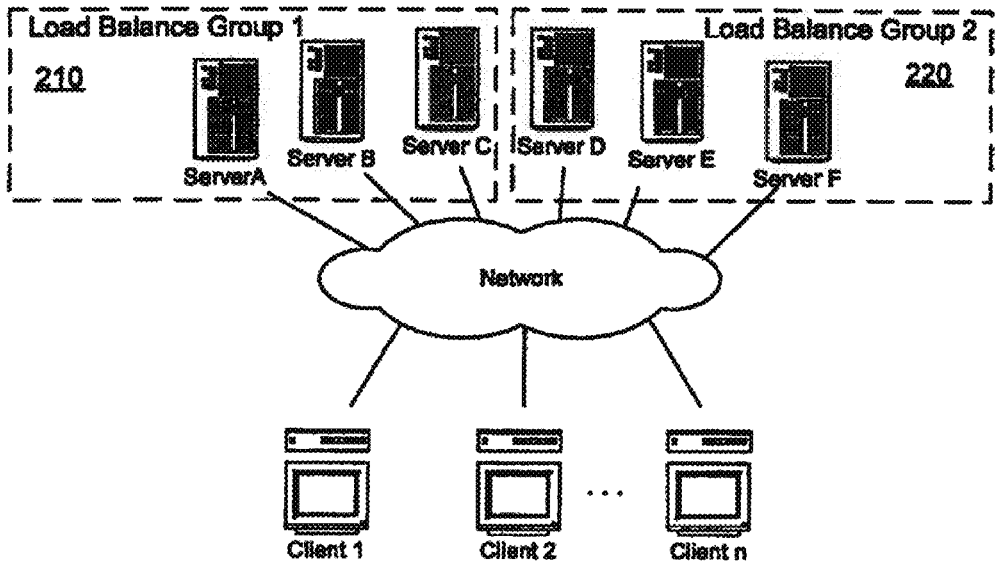
FIG. 2 is a block diagram illustrating an exemplary designation of servers into load-balancing groups.
FIG. 3 is a diagram illustrating exemplary state tables in a preferred embodiment of the present system and method.

FIG. 2 shows an exemplary digital media delivery system that includes six digital media servers A-F which provide content to a plurality of clients via a network. In the exemplary embodiment of FIG. 2, the six servers are divided into two load-balancing groups (LBG) 210, 220. Servers A-C are designated as belonging to load-balancing group 1 (210) and servers D-F are designated as belonging to load-balancing group 2 (220). Load-balancing groups 210, 220 may or may not be geographically diverse, but are logical groupings that designate which servers will share state information in a preferred embodiment of the present system and method, as described below.

Each server A-F preferably maintains state information concerning one or more parameters associated with each server in its group. Accordingly, each of servers A-C preferably maintains such state information for servers A-C and each of servers D-F preferably maintains such state information for servers D-F.

One preferred embodiment for maintaining state information concerning servers in a load-balancing group is shown in FIG. 3. As shown in FIG. 3, a first table 310 preferably comprises a row for each server in load-balancing group 210 and a second table 320 preferably comprises a row for each server in load-balancing group 220. Each table 310, 320 also preferably comprises a plurality of columns for storing state information concerning a plurality of parameters that may be considered in load-balancing determinations, as described below. Such parameters may include, without limitation, Moving Picture Experts Group (MPEG) bandwidth limits, total external storage capacity, addressable service groups (i.e., customer set-top boxes), current number of streams, system central processing unit (CPU) utilization, user CPU utilization, CPU idle, outgoing stream bandwidth, incoming bandwidth for network interfaces, streaming server state, system uptime, time-averaged load, server temperature, memory usage, total available cache, cache used, total external storage remaining, total external storage used, MPEG stream count limit, status of network connections, and status of power supplies, fans, and storage devices.

In a preferred embodiment, one or more of the stored parameters relate to the asset inventory of each server. The state table may also store other media asset parameters such as whether the asset is a "new release" to help anticipate demand for the asset. The state table additionally may contain parameters concerning the capability of each server such as whether it comprises extended memory or an inline adaptable cache (such as that described in U.S. patent application Ser. No. 10/609,433, now U.S. Pat. No. 7,500,055, entitled ADAPTABLE CACHE FOR DYNAMIC DIGITAL MEDIA", filed Jun. 27, 2003, which is hereby incorporated by reference in its entirety for each of its teachings and embodiments), or other unique storage attributes.

In a preferred embodiment, an adaptable cache is adapted to proactively cache resources, and is further adapted to notify potential calling applications and other processes of assets it maintains.

Alternatively or in addition, the adaptable cache may be adapted to direct the storage system not to respond to requests for particular assets when the assets are cached in the adaptable cache. Operation of one preferred embodiment for implementing proactive caching and notification is described in connection with FIG. 9.

Figure 9:
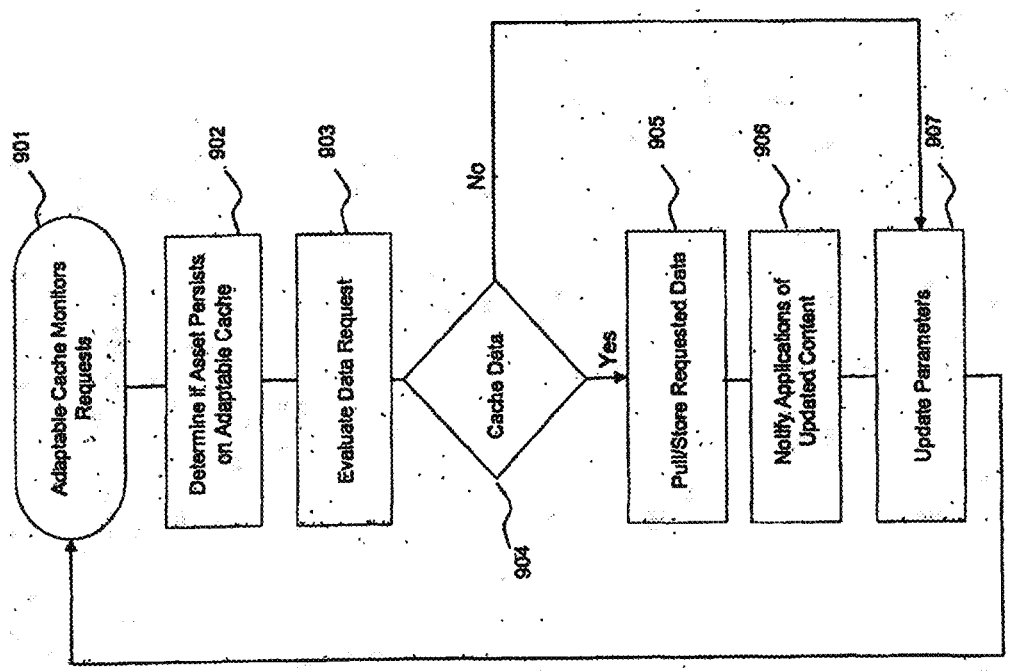
FIG. 9 is a flow diagram illustrating proactive caching in a preferred embodiment of the present invention.

As shown in FIG. 9, in step 901, an adaptable cache monitors an I/O bus for asset requests. These may represent requests for content to be delivered immediately or requests for content to be delivered at a specified later time.

When a request is detected, the adaptable cache determines whether a copy of some or all of the asset is stored in a storage medium (step 902). In step 903, the adaptable cache further evaluates the request in accordance with one or more caching rules programmed into a core logic. In a preferred embodiment, these caching rules may take account of parameters maintained by the core logic, such as available capacity in the adaptable cache and the request frequency for the requested asset.

On the basis of steps 902-903, the adaptable cache determines whether or not some or all of the requested asset or some related asset should be proactively cached (step 904). If it is determined that some or all of an asset should be proactively cached, the system proceeds to step 905 where the adaptable cache communicates directly with the appropriate storage system or device and transfers all or a portion of the asset into its storage medium.

In step 906, the adaptable cache notifies requesting applications and other processes that may require the requested asset of its updated content so that future requests for that asset may be directed to the adaptable cache. These applications/processes, or associated hardware or software may preferably maintain a table that lists assets available from the adaptable cache. Each entity receiving notification from the adaptable cache preferably updates its table appropriately to reflect the current content of the adaptable cache. Processing then proceeds to step 907, described below.

If in step 904 it is determined not to cache requested content, the system proceeds directly to step 907 where parameters maintained by the core logic are updated. In a preferred embodiment, such parameters may, for example, include the number of times a particular asset has been requested within a specified amount of time and available capacity within the adaptable cache. Processing then returns to step 901 where the adaptable cache continues to monitor the I/O bus.

As will be recognized by those skilled in the art, passive monitoring of a bus by an adaptable cache as described above may be impractical with more modern busses which are often segmented and behave more like networks in which each device sees only traffic specifically addressed to it. Accordingly, in systems comprising such busses, a network interface may be adapted to address each received asset request to both a host processor and to an adaptable cache so that the adaptable cache may monitor traffic between the network interface and the host processor. References to monitoring by the adaptable cache herein should be understood to include both passive monitoring as well as monitoring using such a dual addressing scheme.

Alternatively or in addition, an adaptable cache may be adapted to perform interval caching wherein a sorted list of pairs of overlapping requests for the same asset is maintained that identifies pairs of requests with the shortest intervals between their start times. For these pairs, as the first request in the pair is streamed, the streamed content is also cached and then read from cache to serve the second request.

Figure 10:
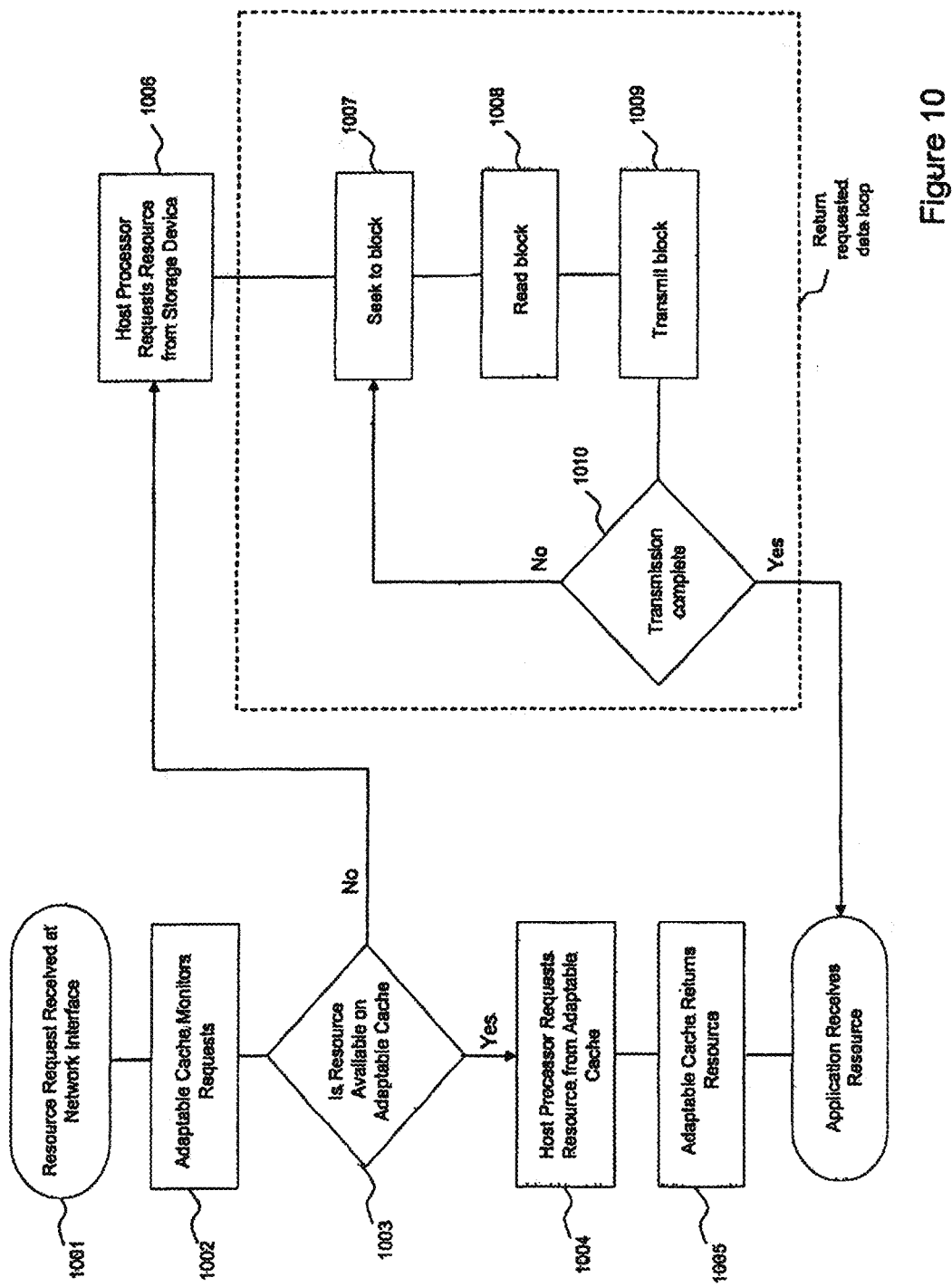
FIG. 10 is a flow diagram illustrating the use of data that has been proactively cached in a preferred embodiment of the present invention.

One preferred embodiment for operation of a media server comprising an adaptable cache adapted for proactive caching and notification will now be described in connection with FIG. 10. As shown in FIG. 10, in step 1001, a request for an asset is received via a network interface and forwarded to a host processor via an I/O bus. In step 1002, the adaptable cache monitors the I/O bus for such requests, caches appropriate content if warranted under its caching rules, and notifies any requesting applications (including the requesting application running on host processor) of its updated content, as described above in connection with FIG. 9.

In step 1003, the host processor determines whether or not the requested asset is available from the adaptable cache, such as by consulting a table that stores current assets maintained by the adaptable cache. If the asset (or some portion of the asset) is available from the adaptable cache, the host processor formulates a request for the asset (or portion thereof) to the adaptable cache (step 1004). In step 1005, the adaptable cache returns the requested asset to the host processor.

Otherwise, if the asset is not available from the adaptable cache, the host processor formulates a request for the asset to a storage system (step 1006). The requested asset is read in blocks from a storage device of the storage system and transmitted to the host processor as shown by the iteration of steps 1007-1010. More particularly, for each block, the storage device finds the block on the hard drive (step 1007), reads the block (step 1008), transmits the block (step 1009), and determines whether or not the asset comprises additional blocks (step 1010).

Figure 11:
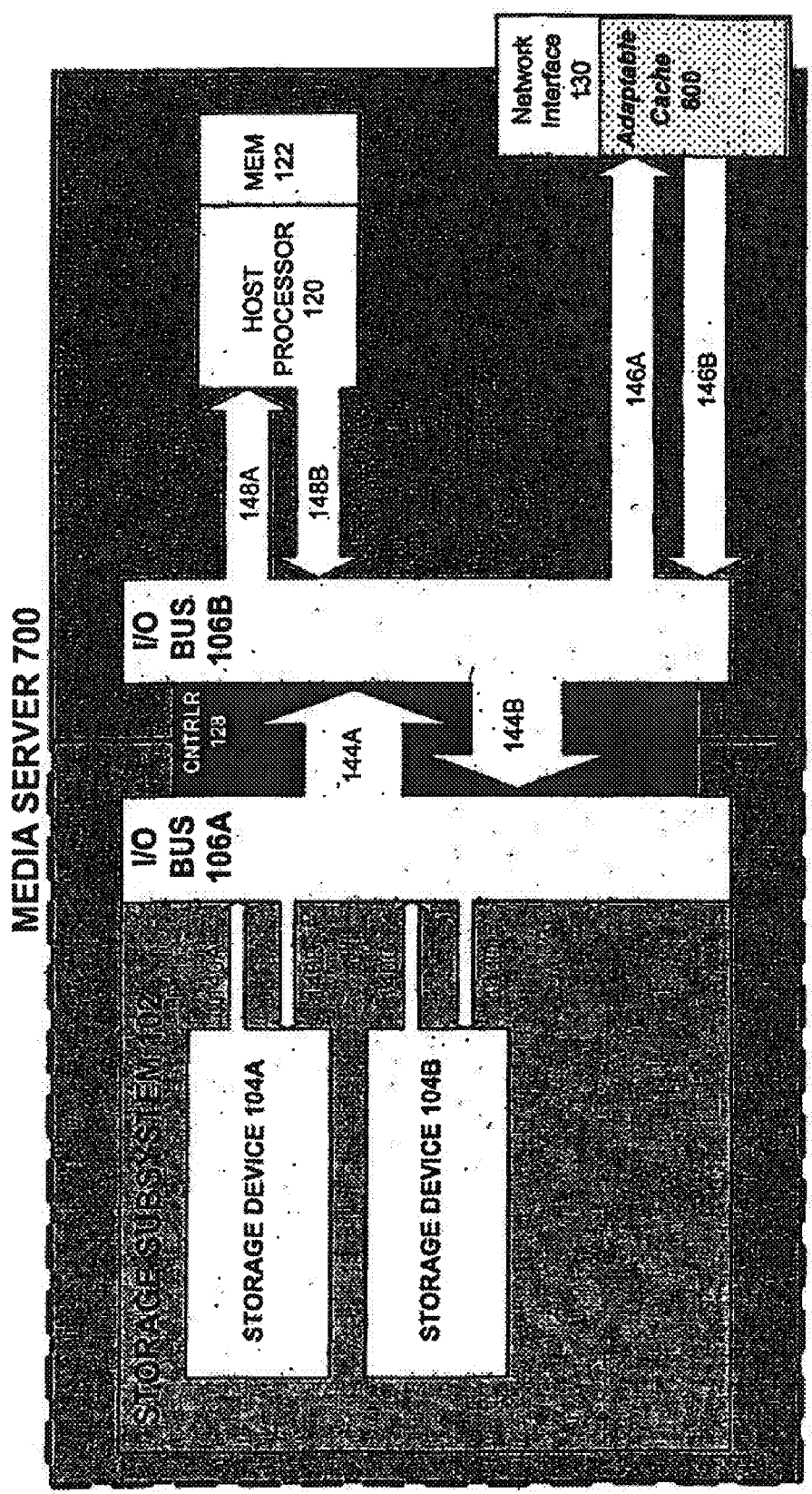
FIG. 11 is a block diagram illustrating a preferred embodiment of the present invention in which an adaptable cache is integrated with a network interface.

Another preferred embodiment for implementing the present system and method is shown in connection with FIG. 11. As in FIG. 10, adaptable cache 600 in FIG. 11 also resides as a device connected to the host side I/O bus 106B. In this embodiment, however, adaptable cache 600 is preferably integrated with network interface 130. The adaptable cache 600 preferably interconnect with the host side I/O bus 106B via interface connection 146. Preferred physical specifications for the adaptable cache in this preferred embodiment comprise:

the form factor of a network interface card (e.g., a peripheral component interconnect or PCI card) which may be plugged into an available expansion slot on the host system (e-g., a PCI slot);

storage capacity in excess of 1 gigabyte (GB) using replaceable commercially off-the-shelf memory modules, (such as dual inline memory modules—DIMMs) or fixed memory circuits; and conformity to PCI hot-swap specifications to allow the adaptable cache to be removed from service while the host system is in operation. As noted above, the storage size of the adaptable cache can therefore be altered through a hot-swap without disrupting the operation of the media server.

In this preferred embodiment, adaptable cache 600 is programmed to respond directly to asset requests when the requested asset is available in its storage medium. In this way, asset requests may be serviced and delivered from the network interface card, eliminating bus traversals when assets requested by the user reside in the adaptable cache.

Figure 12:
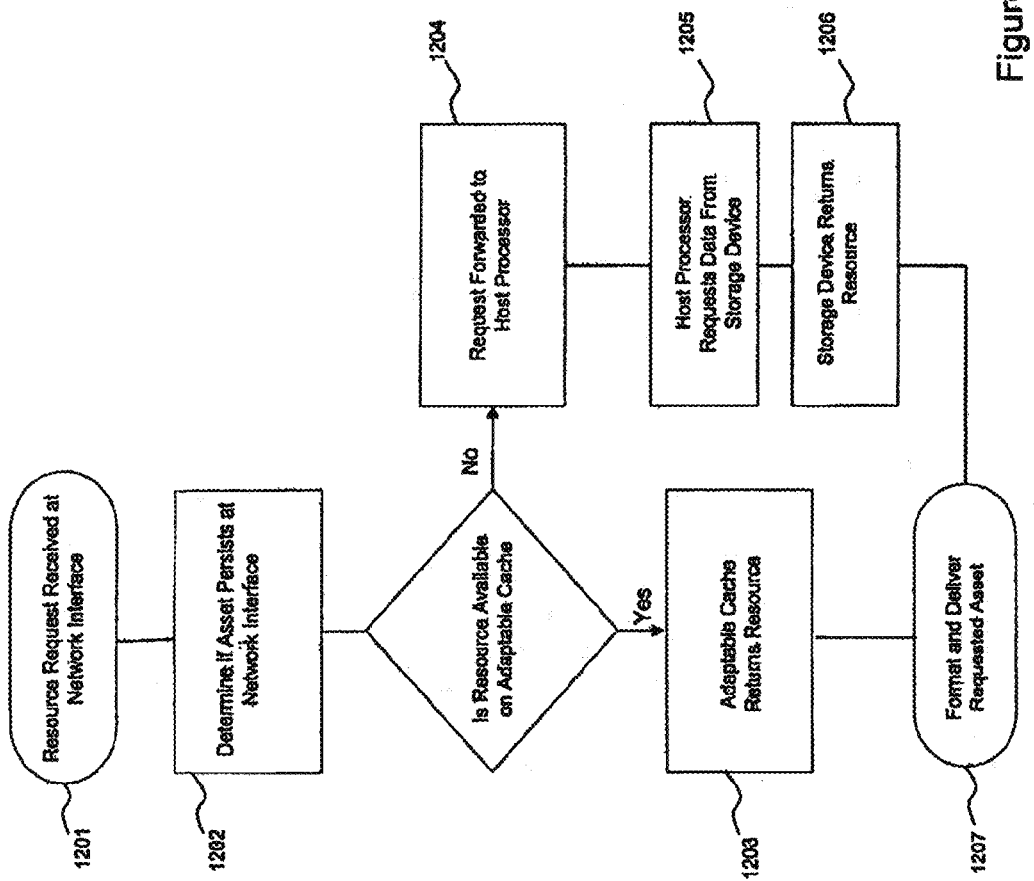
FIG. 12 is a flow diagram illustrating the operation of the preferred embodiment of FIG. 11.

Operation of the system shown in FIG. 11 will now be described in connection with FIG. 12. In step 1201, an asset request is received at network interface 130. In step 1202, adaptable cache 600 determines if the requested asset is available on the adaptable cache.

If the asset is available on the adaptable cache, the request is preferably serviced and delivered to the user from the same card, eliminating bus traversals on buses 106 (step 1203). More specifically, the adaptable cache retrieves the resource from its storage medium, converts it to an appropriate wire format and delivers it to the requesting client.

Otherwise, in step 1204, if the requested resource is not available from the adaptable cache, the request is forwarded to host processor 120 for processing. In step 1205, host processor 120 formulates a request for the asset to storage system 102. In step 1206, the asset is returned to host processor 120, as described above in connection with FIG. 10. In step 1207, host processor 120 converts the asset to an appropriate wire format and delivers it to the client via network interface 130.

It should be recognized that the proactive caching and notification described above may also be implemented in this embodiment. Thus, adaptable cache 600 may be adapted to monitor received requests, proactively cache some or all of an asset in accordance with caching rules, and notify one or more applications or processes of content that it is currently storing. Further, the adaptable cache may be adapted to direct the storage system not to respond to requests for particular assets when the assets are cached in the adaptable cache.

Figure 13:
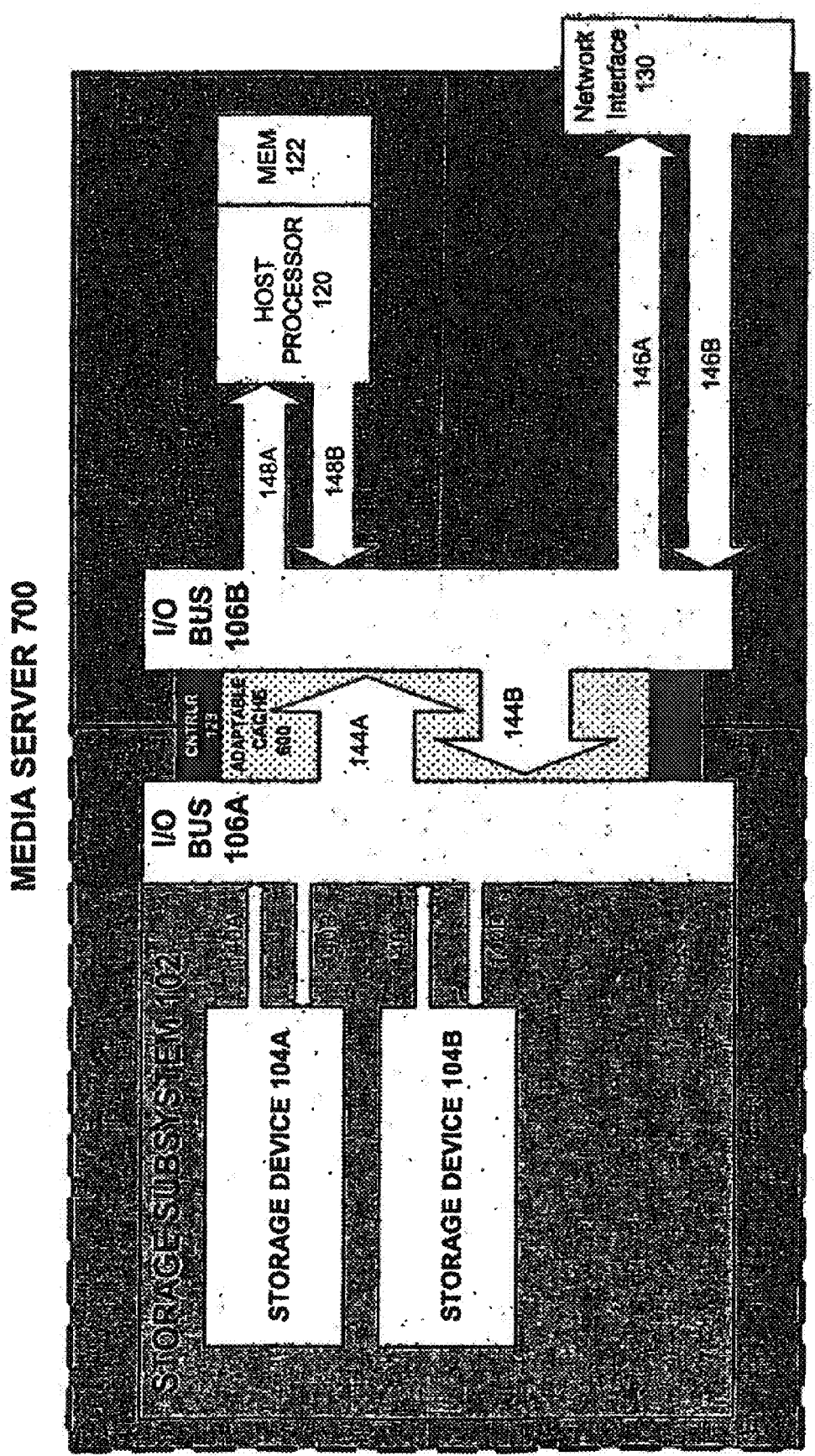
FIG. 13 is a block diagram illustrating a preferred embodiment of the present invention in which an adaptable cache is integrated with a host bus adapter.

Another preferred embodiment for implementing the present system and method is shown in FIG. 13. In the embodiment of FIG. 13, adaptable cache 600 is integrated with controller 128, bridging I/O buses 106A, B. In this embodiment, adaptable cache 600 preferably plugs into an expansion slot on the host system and provides multiple standard high-speed interfaces, such as bridging Fibre Channel and PCI I/O interfaces. In this embodiment, preferred physical specifications of the adaptable cache may include:

the form factor of a peripheral component interconnect (PCI) card;

storage capacity in excess of 1 gigabyte (GB) using replaceable commercially off-the-shelf memory modules (such as dual inline memory modules—DIMMs) or fixed memory circuits; and conformity to PCI hot-swap specifications to allow the adaptable cache to be removed from service while the host system is in operation. As noted above, the storage size of the adaptable cache can therefore be altered through a hot-swap without disrupting the operation of the media server.

Figure 14:
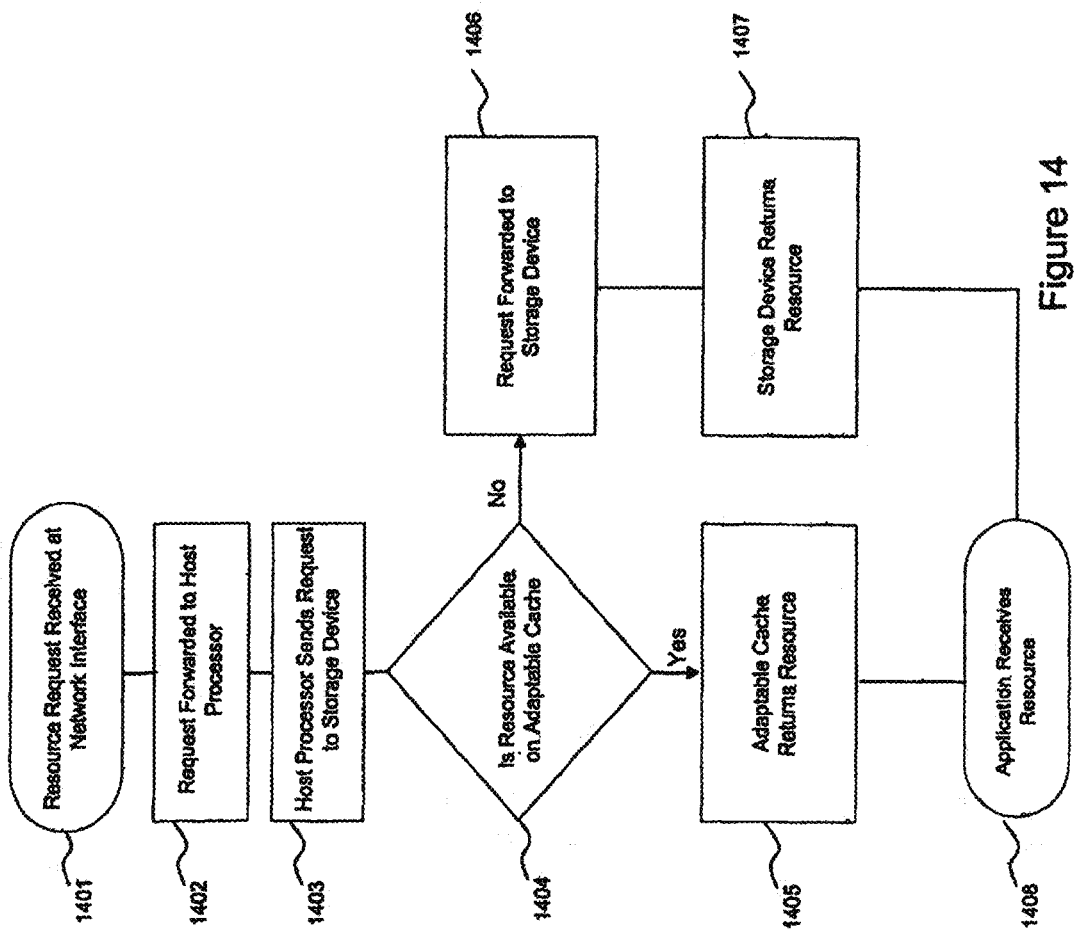
FIG. 14 is a flow diagram illustrating the operation of the preferred embodiment of FIG. 13.

Operation of the system shown in FIG. 13 will now be described in connection with FIG. 14. In step 1401, a user request is received at network interface 130. In step 1402, the request is forwarded to host processor 120 via I/O bus 106B. In step 1403, host processor 120 sends a request for the asset to storage system 102 via I/O bus 106B.

In step 1404, adaptable cache 600 (integrated with controller 128 in this embodiment) monitors asset requests that traverse I/O buses 106A, B and determines if the requested asset is available on the adaptable cache. In step 1405, if the asset is available on the adaptable cache, it is returned to host processor 120.

Otherwise, if the requested resource is unavailable from the adaptable cache, the request is forwarded to storage system I/O bus 106A for delivery to the appropriate storage device 104 where the resource persists (step 1406). In step 1407, the storage device, returns the resource to the requesting application, as described in more detail above. In step 1408, host processor 120 receives the requested resource, as described in more detail above.

It should be recognized that the proactive caching and notification described above may also be implemented in this embodiment. Thus, adaptable cache 600 may be adapted to monitor received requests, proactively cache some or all of an asset in accordance with caching rules, and notify one or more applications or processes of content that it is currently storing. Further, the adaptable cache may be adapted to direct the storage system not to respond to requests for particular assets when the assets are cached in the adaptable cache.

Figure 15:
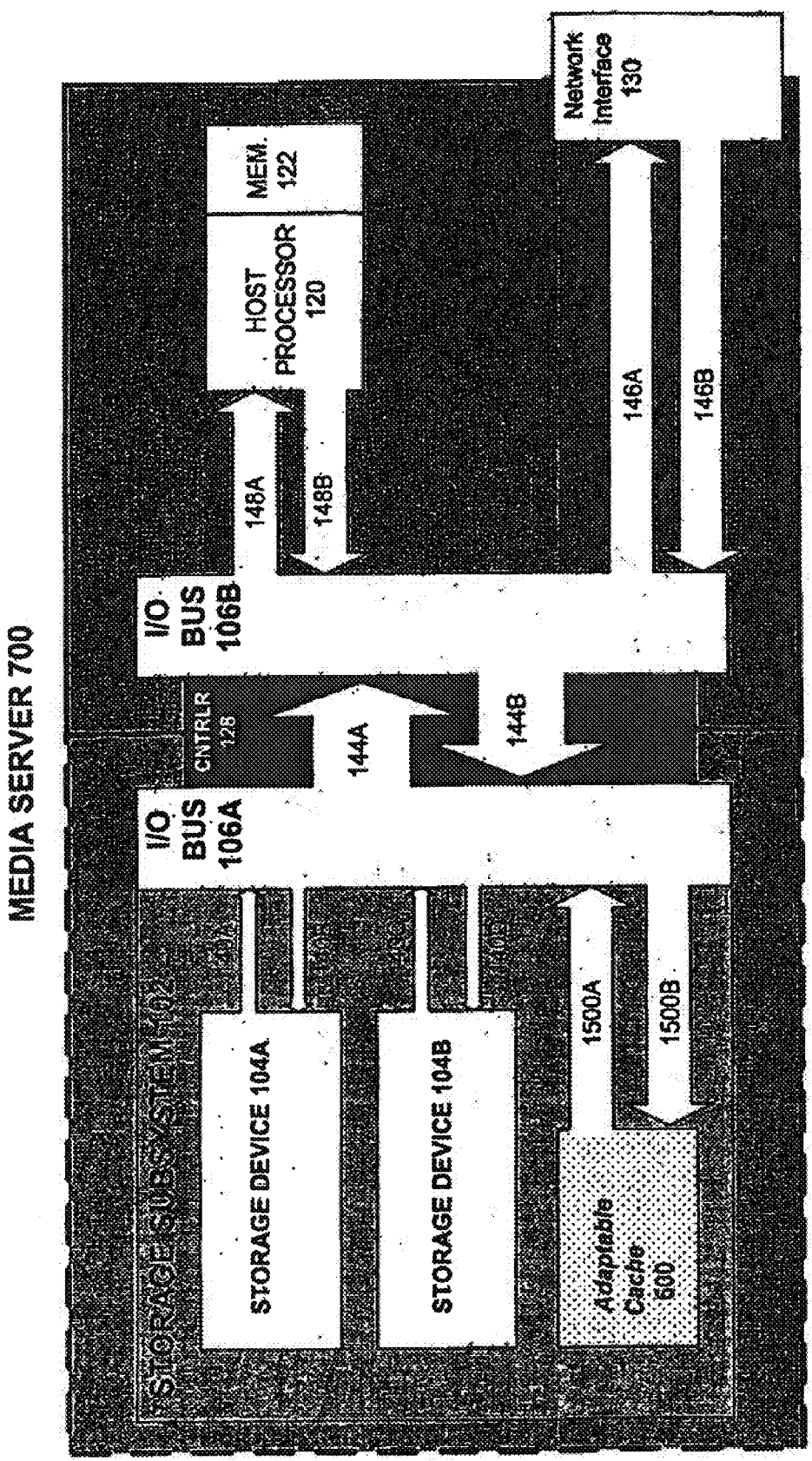
FIG. 15 is a block diagram illustrating a preferred embodiment of the present invention in which an adaptable cache is connected to a storage-system bus.

Yet another preferred embodiment for implementing the present system and method is shown in FIG. 15. In FIG. 15, an adaptable cache 600 resides on storage system 102. Adaptable cache 600 preferably interconnects with storage system I/O bus 106A via a high-speed interface connection 1500. This high-speed interface connection preferably allows adaptable cache 600 to replace or supplement existing hard drive storage devices on storage system 102 (including RAID arrays or JBODS) as long as the system has a compatible receptacle and I/O interface. In this embodiment, preferred physical specifications of the adaptable cache comprise:

- the form factor of a 3.5" hard disk drive with a 1" nominal height;
- dual fibre channel interface utilizing a standard SCA 40-pin connector and operating at transfer rates of either 1 or 2 gigabits per second (Gbps);
- storage capacity in excess of 1 gigabyte (GB) using replaceable commercially off-the-shelf memory modules (such as dual inline memory modules—DIMMs) or fixed memory circuits—this facilitates a lower cost while simultaneously providing the benefit of readily available and quality controlled components; and
- hot-swap capability (the ability to swap or remove the adaptable cache from service while the system is in operation). As noted above, the storage size of the adaptable cache can therefore be altered through a hot-swap without disrupting the operation of the media server.

Operation of the preferred embodiment shown in FIG. 15 will now be described in connection with FIG. 16. In step 1601, a user request is received at network interface 130. In step 1602, the request is forwarded to host processor 120 via I/O bus 106B. In step 1603, host processor 120 sends a request for the asset to storage system 102 via I/O bus 106B.

In step 1604, adaptable cache 600 monitors asset requests that traverse I/O bus 106A and determines if the requested asset is available on the adaptable cache. As noted above, those skilled in the art will recognize that passive monitoring of bus 106B by adaptable cache 600 may be impractical with more modern busses which are often segmented and behave more like networks in which each device sees only traffic specifically addressed to it. Accordingly, as noted above, in systems comprising such busses, host processor 120 may be adapted to address each received asset request to both storage device 104 and to adaptable cache 600 so that adaptable cache 600 may monitor traffic between host processor 120 and storage device 104.

In step 1605, if the asset is available on the adaptable cache, it is returned to host processor 120. In this case, the adaptable cache or other suitable component in storage system 102 may also preferably be adapted to preclude other storage devices 104 from responding to the request from host processor 120 since such storage device will be unable to retrieve and forward the asset to host processor 120 as efficiently as adaptable cache 600 (step 1606).

Otherwise, if the requested resource is unavailable from the adaptable cache, the request is delivered to the appropriate storage device 104 where the resource persists (step 1607). In step 1608, the storage device returns the resource to the requesting application, as described in more detail above.

It should be recognized that the proactive caching and notification described above may also be implemented in this embodiment. Thus, adaptable cache 600 may be adapted to monitor received requests transmitted via 110 bus 106A, proactively cache some or all of an asset in accordance with caching rules, and notify one or more applications or processes of content that it is currently storing. Alternatively, these caching and monitoring components may be divided. More specifically, a separate monitoring component may be provided on I/O bus 106A to monitor requests as they are received by network interface 130. When appropriate, the monitoring component may instruct adaptable cache 600 (residing, for example, on 110 bus 106A) to retrieve and store some or all of an asset.

It should also be noted that although, in the preferred embodiments described above, system components are linked via PCI buses such as bus 106A, B, these components may alternatively be linked via other bus types or data exchanges such as switched fabric and associated daughtercards.

In a preferred embodiment, threshold limits may be specified for one or more of the stored parameters that represent an unacceptable condition. Use of these threshold limits in selecting a server to deliver requested content is described in more detail below.

Figure 4:
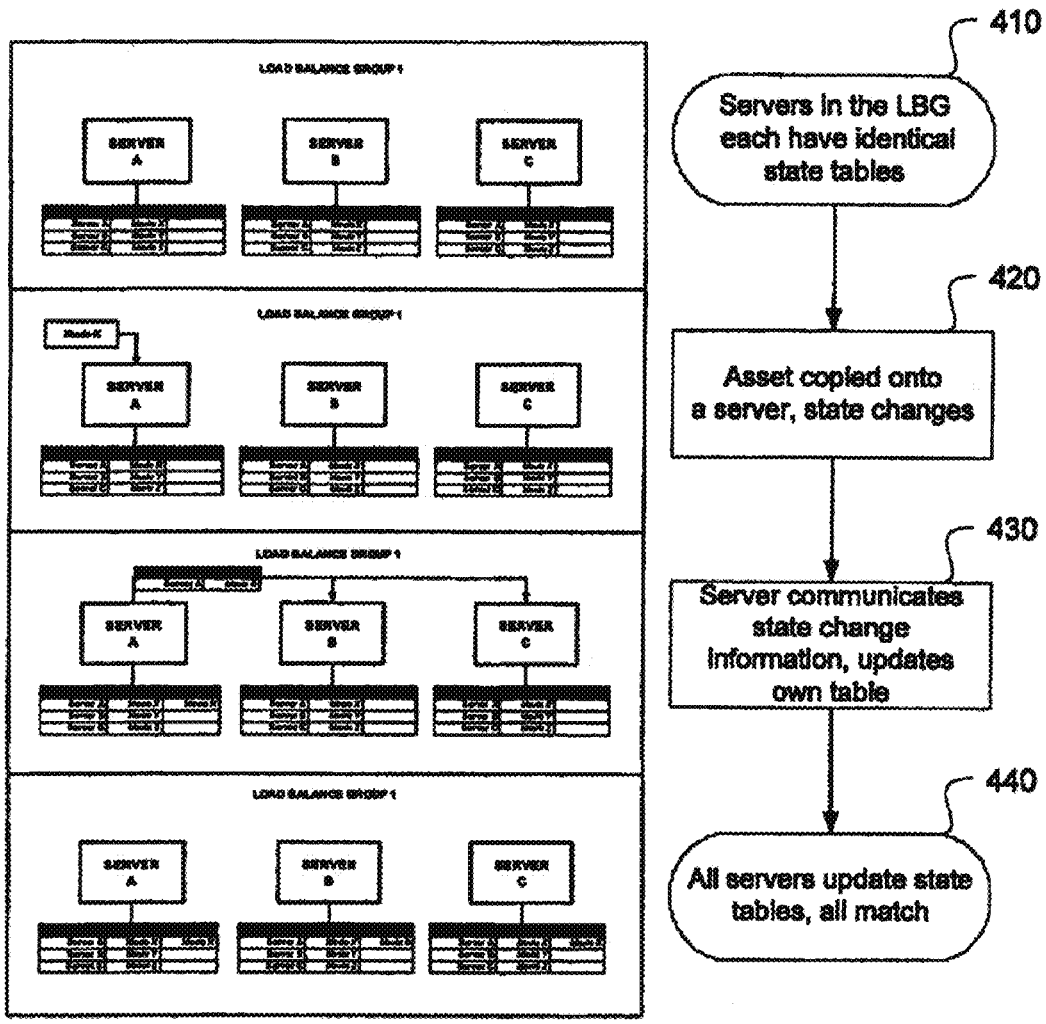
FIG. 4 is a flowchart illustrating a preferred embodiment of a process for updating state tables.

A preferred embodiment for updating state tables 310, 320 at each server is illustrated in FIG. 4. As shown in FIG. 4, in step 410, all servers in a load-balancing group initially have identical state tables. In step 420, a parameter of server A is modified (e.g., an asset is copied onto server A), thus changing server A's state. In step 430, server A updates its own state table, and pushes the state change information to all other servers in its load-balancing group. In a preferred embodiment, this state change information is transmitted concurrently to all other servers in the group via, for example, a multicast, broadcast, or other one-to-many communications mechanism. In step 440, the other servers update their state tables with the state change information, and the state tables of all servers are again synchronized. In addition, each server is preferably adapted to add or remove parameter columns from its state tables, so that load-balancing algorithms applied by the servers may change over time and take account of different combinations of parameters.

Figure 5A:
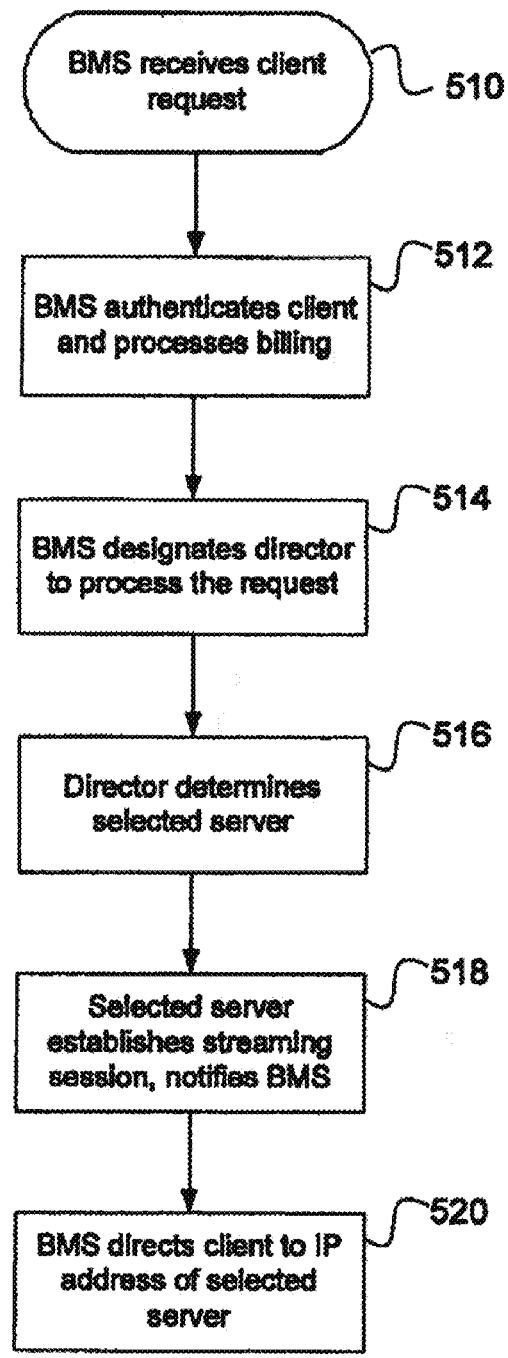
FIGS. 5A and 5B are flowcharts illustrating a preferred embodiment of the present system and method for load-balancing in a multi-server system.

FIG. 5A illustrates a preferred embodiment for responding to a request for content from, for example, a client set-top box. In step 510, the content request is received by a business management system (BMS) of the digital media delivery system. The business management system is preferably adapted to provide billing, authentication, conditional access, programming guide information, and other functions to client set-top boxes.

In step 512, the business management system authenticates the client and bills the client for the request. In step 514, the business management system designates one of the media servers of the digital media delivery system to act as a director for this request. The role of the director is to select an appropriate server to deliver the requested content to the client, as described below. In a preferred embodiment, the director may be selected by the business management system on a rotating basis. In an alternative preferred embodiment, the director may be selected on the basis of server load (i.e., the server with lowest current load is designated to act as director for the request).

In step 516, the server designated to act as director for this request selects a server from its load-balancing group to deliver the requested content to the client. As described below, this server may be the director itself or another server in its group. Preferred embodiments for making this selection are described below in connection with FIGS. 5B and 6.

In step 518, the server selected to deliver the content sets up a streaming session and notifies the business management system that it is ready to stream the requested content to the client. In step 520, the business management system directs the client to the IP address of the selected server and delivery of the requested content is commenced.

In an alternative preferred embodiment, after selecting a server to act as director for a request, the business management system provides the director's IP address directly to the client. In this embodiment, the client contacts the director which selects a server to provide the requested content and then provides that server's IP address to the client when the streaming session is set up.

Figure 5B:
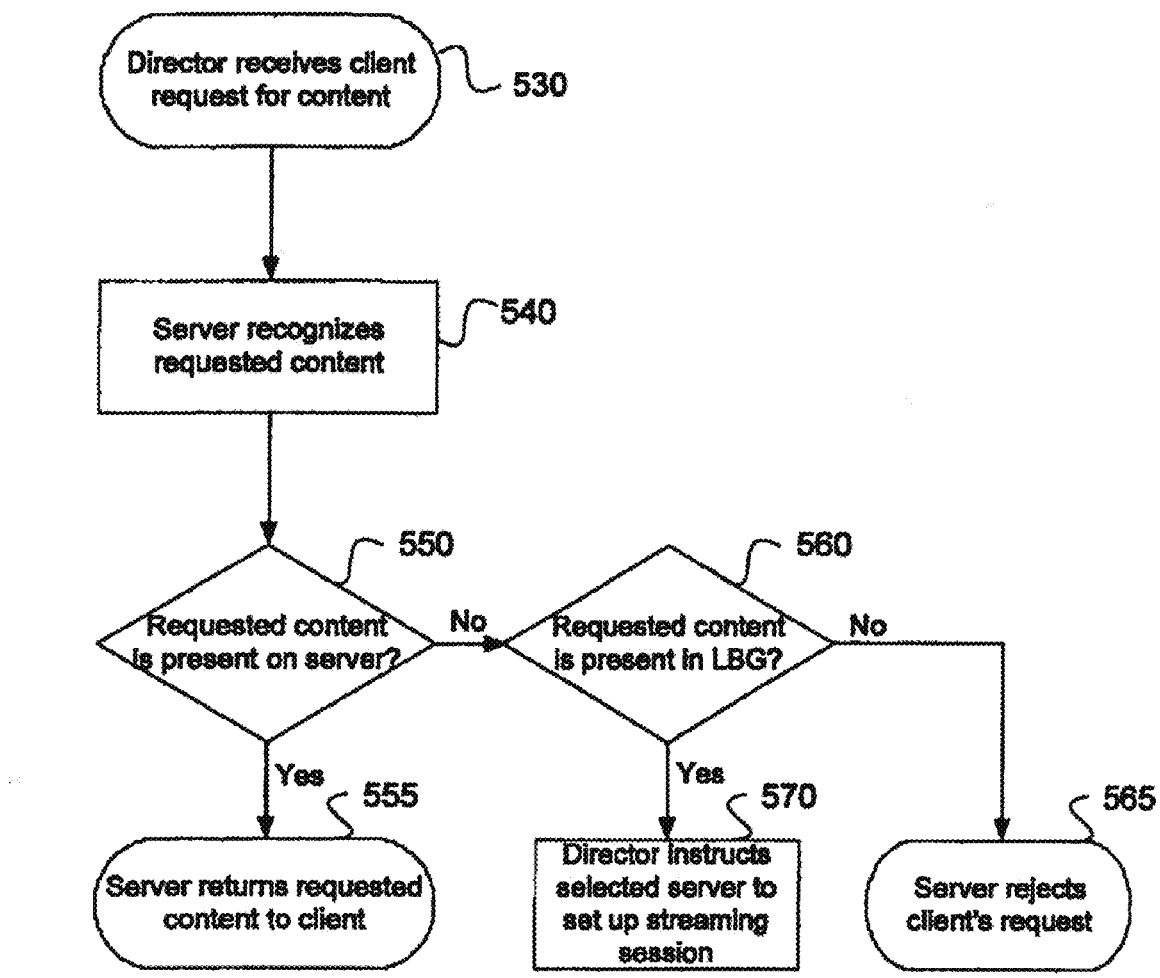

One preferred embodiment that may be utilized by a director for selecting a server to deliver requested content is now described in connection with FIG. 5B. As shown in FIG. 5B, in step 530, a content request is received by the server designated by the business management system to act as director for the request. In step 540, the director identifies the requested content and determines whether or not the director has this content available. If the content is available from the director itself (step 550), it designates itself to deliver the requested content (step 555). Otherwise, in step 560, the server examines its state table 310 to see if the content is available from another server in its load-balancing group. If the content is not available in the group, the director rejects the request (step 565). Otherwise, as described above, the director instructs the selected server to set up a streaming session for the client and redirects the client to submit the request to that server when the session is set up (step 570). Two alternatives to step 570 are described respectively in connection with FIGS. 5C and 5D. In the first alternative, the director forwards the request to the selected server which directly respond to the client when the streaming session is set up. In the second alternative, the director redirects the client to the selected server and the client directly requests establishment of a streaming session from the selected server.

Figure 5C:
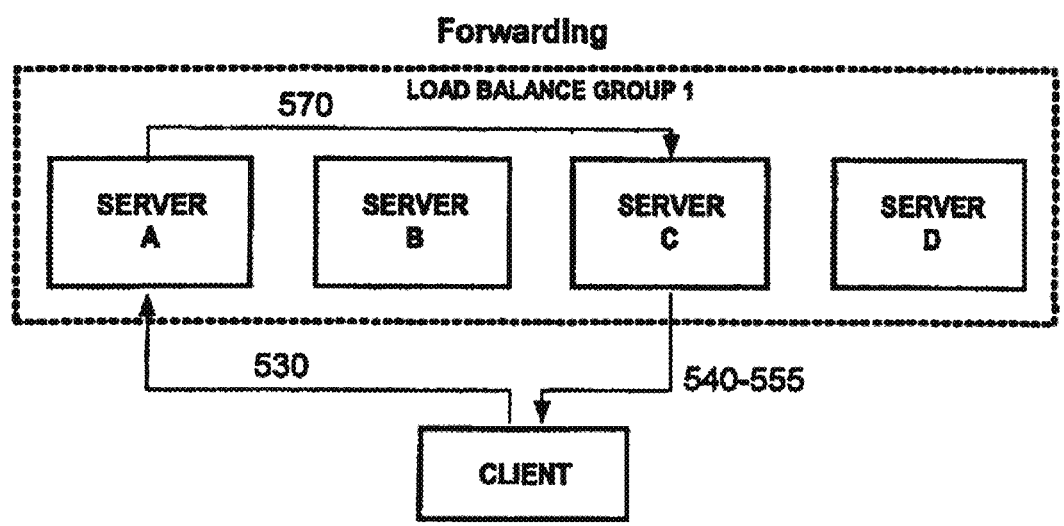
FIGS. 5C and 5D are block diagrams illustrating the communication paths for forwarding and redirecting client content requests in a preferred embodiment of the present system and method.

This first alternative is illustrated in an exemplary communication block diagram shown in FIG. 5C. More specifically, as shown in FIG. 5C, in step 530, server A receives a request from the client. In step 570, server A concludes that a different server in the group can service the request (server C in this example), and forwards the request to that server. Server C processes the forwarded request as if it were received directly from the client, and performs steps 540-555 shown in FIG. 5B to deliver the requested content to the client.

Figure 5D:
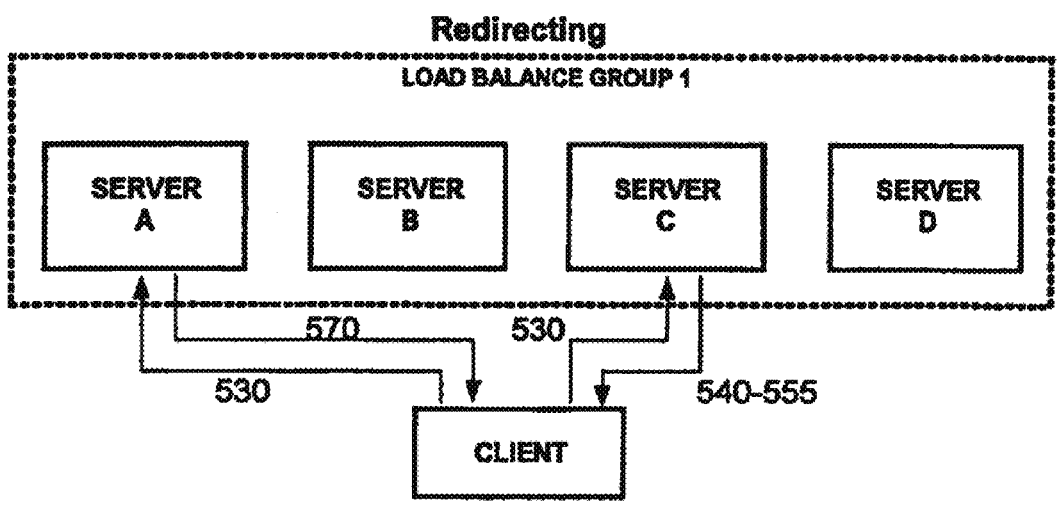

Turning to FIG. 5D which illustrates the second alternative, in step 530, server A receives a request from the client. In step 570, server A concludes that a different server in the group can service the request (server C in this example), and sends an acknowledgment to the client, redirecting the client to that server. The client then retransmits its request to server C (step 530). Server C processes the request, and performs steps 540-555 shown in FIG. 5B to deliver the requested content to the client.

Figure 6:
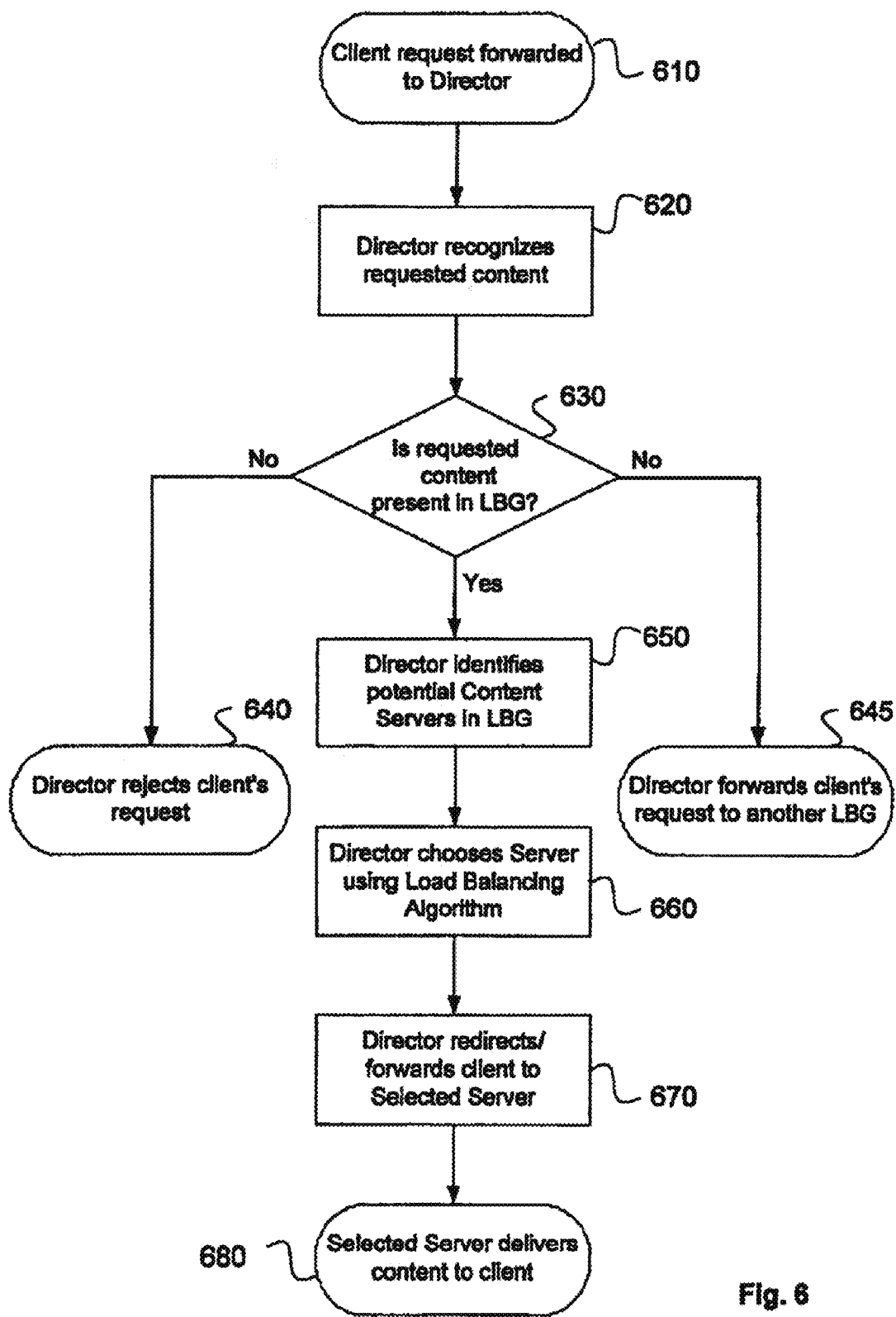
FIG. 6 is a flowchart illustrating a preferred embodiment of the present system and method for load-balancing in a multi-server system with replicated content.

In a preferred embodiment, content may be replicated on multiple servers in a load-balancing group to satisfy request volumes that may exceed a single server's capacity. Moving or copying content from one server to another in a load-balancing group may also be used as a strategy to further distribute load within the group. FIG. 6 illustrates a preferred system and method for load-balancing content requests in a multi-server system with replicated content.

As shown in FIG. 6, in step 610, a client makes a request for content. The request is forwarded to a business management system which designates a server as director for this request and forwards the request to the director, as described above. In step 620, the director analyzes the request to identify the requested content. In step 630, the director determines if the requested content is present in the load-balancing group by consulting its state table. If the content is not present in the load-balancing group, the director rejects the request (step 640).

In an alternative embodiment, the director may forward the request to a server in another load-balancing group. This alternative, however, suffers from significant drawbacks, because the director in the present embodiment has no knowledge whether the content is present in the other load-balancing groups, and a poor level of service may result depending upon the ability of a second load-balancing group to provide the content. To overcome this drawback, each server may be provided with additional state tables with information concerning servers in other load-balancing groups. Alternatively, all servers in the system may be designated as belonging to a single load-balancing group. These alternatives, however, present their own disadvantages including increased overhead to update and maintain state tables.

Returning to FIG. 6, if the content is available in the load-balancing group, the server examines its state table to identify those servers in the group that have the requested content (step 650). In step 660, the server applies a load-balancing algorithm to choose a server in its group to supply the requested content. One preferred embodiment of such an algorithm is described in more detail below. In step 670, the client request is redirected or forwarded to the selected server as described above in connection with FIGS. 5B-5D. In step 680, the selected server delivers the requested content to the client. In step 690, the selected server updates its state table to reflect corresponding changes in its load and other parameters and communicates these state-table changes to the other servers in its load-balancing group.

Figure 7:
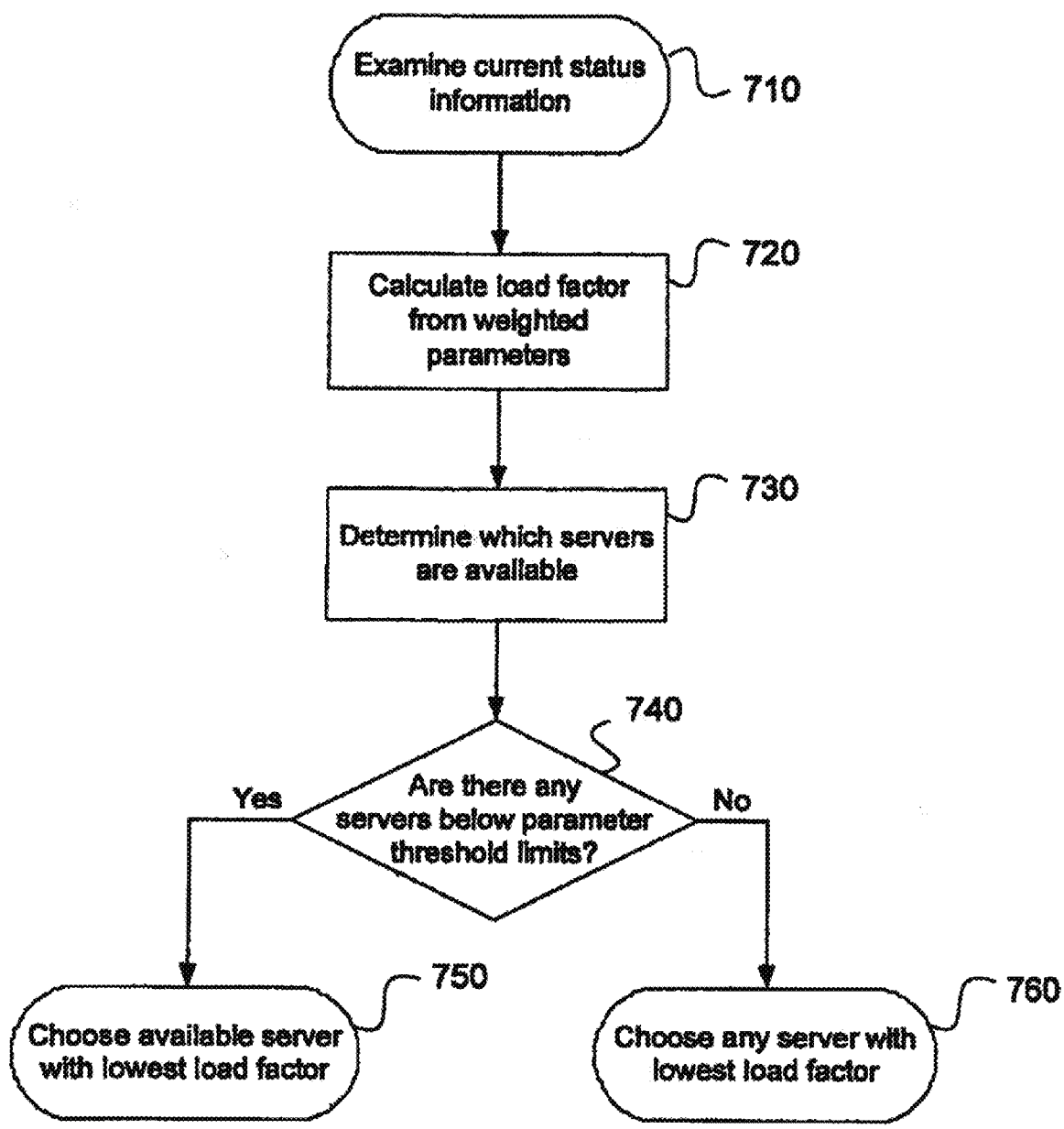
FIG. 7 is a flowchart illustrating a preferred load-balancing algorithm.

A preferred embodiment of a load-balancing algorithm for selecting a server to deliver requested content is illustrated in FIG. 7. As shown in FIG. 7, in step 710, the director examines its state table to identify all servers in its load-balancing group that have the requested content and are operational (referred to hereafter as target servers).

In step 720, the server calculates a load factor for each of the target servers from a weighted sum of parameters indicative of load. In a preferred embodiment, the parameters used to calculate the load factor for each server are: incoming streaming bandwidth, outgoing streaming bandwidth, total storage usage, memory usage, and CPU utilization.

In step 730, the server determines whether any target servers have exceeded a parameter threshold limit. For example, a target server may have an abundance of outgoing streaming bandwidth available, but the server's CPU utilization parameter may be very high and exceed the threshold limit established for that parameter. This target server would therefore not be a preferred choice to serve the requested content. As used herein, the term available servers refers to target servers that have not exceeded any threshold limits.

In step 740, the server determines if there are any available servers. If so, in step 750, the server chooses the available server having the lowest load factor to deliver the requested content. If not, then in step 760, the server chooses the target server having the lowest load factor from all target servers.

FIG. 8 shows an exemplary state table suitable for illustrating the above-described process of FIG. 7. For purposes of the present example, it is assumed that the three listed servers A-C are members of load-balancing group 1 and that each maintains the exemplary state table of FIG. 8. It is further assumed that a client places a request to view the asset "Dare Devil," a feature-length film.

The director, assume server B, examines its state table and determines that the content for "Dare Devil" is stored on servers A and C. Since servers A and C are up, they are the target servers.

Server B then calculates the load factor for each of the target servers. The load factor is preferably defined to be a weighted average of parameters. For the purpose of this example, it is assumed that the bandwidth capacity, both incoming and outgoing, is 500, and the load factor is expressed as an average of each parameter, measured in percent capacity. Thus, server B would determine the load factor of server A as (4700/500+27500/500+34+37+40)/5%=35%, and the load factor of server C as (1300/500+39600/500+56+60+64)/5%=52.4%.

Next, server B determines whether both servers are available. For the purpose of this example, it is assumed that the threshold limit set for each parameter on each server is 75%. Since no threshold limits are exceeded by any target server, servers A and C are both available servers. Since there is at least one available server, server B chooses the server with the lowest load factor, namely server A.

As server A starts supplying the "Dare Devil" content, it updates its state-table parameters to reflect this fact (e.g., overall load, bandwidth, etc.). Server A preferably broadcasts these changes to all other servers in its load-balancing group, as described above.

While the invention has been described in conjunction with specific embodiments, it is evident that numerous alternatives, modifications, and variations will be apparent to persons skilled in the art in light of the foregoing description.

What is claimed is:

1. A method for selecting a server from a plurality of servers to service a third request for an asset, comprising:
   generating, at an adaptable cache of a first server, a list of pairs of requests for the asset and determining a pair of requests having the shortest interval between start times, wherein the pair of requests comprise a first request and a second request;
   responsive to the first request, streaming the asset from a storage system of the first server and storing the asset on the adaptable cache of the first server as it is being streamed from the storage system of the first server;
   responsive to the second request streaming the asset from the adaptable cache of the first server;
   updating a first state table on the first server with information about the asset stored on the adaptable cache of the first server;
   communicating the information about the asset stored on the adaptable cache of the first server to each server in the plurality of servers;
   updating state tables of each of the other servers in the plurality of servers with the information about the asset stored on the adaptable cache of the first server;
   designating a director from the plurality of servers to receive the third request, wherein any of the plurality of servers can be designated as the director;
   determining that the asset is not stored on an adaptable cache of the director by accessing a director's state table stored on the director, wherein the director's state table includes parametric information for each server in the plurality of servers, and wherein the parametric information comprises adaptable cache contents information for each server in the plurality of servers; and
   under the direction of the director,
      determining a set of servers from among said plurality of servers that have the asset stored in their respective adaptable caches by examining the state table on the director;
      determining a load factor for each of the set of servers; and
      selecting a second server from among the set of servers based on the load factor.

2. The method of claim 1, wherein designating the director comprises designating the director in a round-robin fashion.

3. The method of claim 1, wherein the director is designated based on a load factor analysis for each server among said plurality of servers, the load factor for each server based on parametric information stored in a respective state table thereon, and wherein the designated director has a lowest load factor.

4. The method of claim 1, further comprising designating the director upon determining that the asset is present on the director.

5. The method of claim 1, wherein said parametric information further comprises functional state and current load of each server.

6. The method of claim 1, wherein said parametric information further comprises whether each server comprises extended memory.

7. The method of claim 1, wherein said parametric information further comprises whether each server comprises an inline adaptable cache.

8. The method of claim 1, wherein said parametric information further comprises whether each asset represented in the parametric information is a new release.

9. The method of claim 1, further comprising storing the asset on the adaptable cache of the director responsive to the third request.

10. The method of claim 1, further comprising forwarding the third request to the second server.

11. The method of claim 1, further comprising redirecting the third request to the second server.

12. The method of claim 1, wherein selecting the second server from among the set of servers further comprises:
   identifying as available servers any servers whose load factors are below threshold limits;
   determining that there are no available servers; and
   upon determining that there are no available servers, selecting a server having a lowest load factor from the other servers having the content.

13. The method of claim 1, further comprising updating parametric information in a second state table on the second server, and communicating updated parametric information to the other servers among said plurality of servers.

14. The method of claim 13, wherein the updated parametric information is communicated via multicast.

15. The method of claim 13, wherein the updated parametric information is communicated via a broadcast message.

16. A computer-readable medium comprising computer-executable instructions for performing a method comprising:
   generating, at an adaptable cache of a first server, a list of pairs of requests for an asset and determining a pair of requests having the shortest interval between start times, wherein the pair of requests comprise a first request and a second request;
   responsive to the first request, streaming the asset from a storage system of the first server and storing the asset on the adaptable cache of the first server as it is being streamed from the storage system of the first server;
   responsive to the second request, streaming the asset from the adaptable cache of the first server;
   updating a first state table on the first server with information about the asset stored on the adaptable cache of the first server, wherein the first server communicates the information about the asset stored on the adaptable cache of the first server to each server in the plurality of servers, and wherein each server in the plurality of servers updates each state table of each server in the plurality of servers with the information about the asset stored on the adaptable cache of the first server;

designating a director from the plurality of servers to receive a third request, wherein any of the plurality of servers can be designated as the director;

determining that the asset is not stored on an adaptable cache of the director by accessing a state table stored on the director, wherein the state table includes parametric information for each server in the plurality of servers, and wherein the parametric information comprises adaptable cache contents information for each server in the plurality of servers; and under the direction of the director, determining a set of servers from among said plurality of servers that have the asset stored in their respective adaptable caches by examining the state table on the director;

determining a load factor for each of the set of servers; and, selecting a second server from among the set of servers based on the load factor.

17. The computer-readable medium of claim 16, wherein designating the director comprises designating the director in a round-robin fashion.

18. The computer-readable medium of claim 16, wherein designating the director comprises designating the director on the basis of lowest load.

19. The computer-readable medium of claim 16, wherein designating the director further comprises designating the director if the requested content is present on the director.

20. The computer-readable medium of claim 16, wherein said parametric information further comprises functional state and current load of each server.

21. The computer-readable medium of claim 16, wherein said parametric information further comprises whether each server comprises extended memory.

22. The computer-readable medium of claim 16, wherein said parametric information further comprises whether each server comprises an inline adaptable cache.

23. The computer-readable medium of claim 16, wherein said parametric information further comprises whether each asset represented in the parametric information is a new release.

24. The computer-readable medium of claim 16, further comprising computer-executable instructions for storing the asset on the adaptable cache of the director responsive to the third request.

25. The method of claim 1, further comprising updating parametric information in a second state table associated with the selected on the second server, and communicating updated parametric information to the other servers among said plurality of servers.

26. The computer-readable medium of claim 16, further comprising computer-executable instructions for redirecting the third request to the second server.

27. The computer-readable medium of claim 16, wherein the step of selecting the second server from among the set of servers further comprises:

identifying as available servers one or more servers whose load factors are below threshold limits;

determining that there are no available servers; and upon determining that there are no available servers, selecting a server having a lowest load factor from the other servers having the content.

28. A system for servicing a request for an asset, comprising:

an adaptable cache of a first server configured to generate a list of pairs of requests for the asset and determine a pair of requests having the shortest interval between start times, wherein the pair of requests comprise a first request and a second request;

a storage system of the first server configured to stream the asset responsive to the first request;

the adaptable cache of the first server further configured to store the asset as the asset is streamed from the storage system of the first server;

the adaptable cache of the first server configured to stream the asset responsive to the second request;

the first server configured to update a first state table with information about the asset stored on the adaptable cache of the first server;

the first server further configured to communicate the information about the asset stored on the adaptable cache of the first server to each server in the plurality of servers;

each server in the plurality of servers configured to update their respective state tables with the information about the asset stored on the adaptable cache of the first server;

a business management system configured to designate a director from the plurality of servers to receive the third request, wherein any of the plurality of servers can be designated as the director;

the director configured to determine that the asset is not stored on an adaptable cache of the director by accessing a director's state table, wherein the director's state table includes parametric information for each server in the plurality of servers, and wherein the parametric information comprises adaptable cache contents information for each server in the plurality of servers; and the director further configured to:

determine a set of servers from among said plurality of servers that have the asset stored in their respective adaptable caches by examining the director's state table, determine a load factor for each of the set of servers; and select a second server from among the set of servers based on the load factor.

29. The system of claim 28, wherein the business management system configured to designate the director comprises the business management system configured to designate the director in a round-robin fashion.

30. The system of claim 28, wherein the business management system configured to designate the director comprises the business management system configured to designate the director based on a load factor analysis for each server among the plurality of servers, the load factor for each server based on parametric information stored in a respective state table thereon, and wherein the designated director has a lowest load factor.

31. The system of claim 28, wherein the business management system configured to designate the director comprises the business management system configured to designate the director upon determining that the asset is present on the director.

32. The system of claim 28, wherein said parametric information further comprises at least one of a functional state of each server, a current load of each server, whether each server comprises extended memory, whether each server comprises an inline adaptable cache, and whether each asset represented in the parametric information is a new release.

33. The system of claim 28, wherein the director is further configured to perform at least one of storing the asset on the adaptable cache of the director responsive to the third request, forwarding the third request to the second server, and redirecting the third request to the second server.

34. The system of claim 28, wherein the director configured to select the second server from among the set of servers further comprises the director configured to:
  identify as available servers any servers whose load factors are below threshold limits;
  determine that there are no available servers; and
  upon determining that there are no available servers, select a server having a lowest load factor from the other servers having the content.

35. The system of claim 28, further comprising updating parametric information in a second state table on the second server, and communicating updated parametric information to the other servers among said plurality of servers.

36. A system for servicing a request for an asset, comprising:
  an adaptable cache means of a first server for generating a list of pairs of requests for the asset and determining a pair of requests having the shortest interval between start times, wherein the pair of requests comprise a first request and a second request;
  means for streaming, responsive to the first request, the asset from a storage system of the first server and storing the asset on the adaptable cache means of the first server as it is being streamed from the storage system of the first server;
  means for streaming the asset from the adaptable cache means of the first server responsive to the second request;
  means for updating a first state table on the first server with information about the asset stored on the adaptable cache means of the first server;
  means for communicating the information about the asset stored on the adaptable cache means of the first server to each server in the plurality of servers;
  means for updating state tables of each of the other servers in the plurality of servers with the information about the asset stored on the adaptable cache means of the first server;
  means for designating a director from the plurality of servers to receive the third request, wherein any of the plurality of servers can be designated as the director;
  means for determining that the asset is not stored on an adaptable cache of the director by accessing a director's state table stored on the director, wherein the director's state table includes parametric information for each server in the plurality of servers, and wherein the parametric information comprises adaptable cache contents information for each server in the plurality of servers; and
  means under the direction of the director for:
    determining a set of servers from among said plurality of servers that have the asset stored in their respective adaptable caches by examining the state table on the director;
    determining a load factor for each of the set of servers; and
    selecting a second server from among the set of servers based on the load factor.

* * * * *

UNITED STATES PATENT AND TRADEMARK OFFICE
CERTIFICATE OF CORRECTION

PATENT NO.         : 7,912,954 B1                                          Page 1 of 1
APPLICATION NO.    : 10/609426
DATED              : March 22, 2011
INVENTOR(S)        : Oesterreicher et al.

It is certified that error appears in the above-identified patent and that said Letters Patent is hereby corrected as shown below:

Column 13, line 36, in Claim 1, delete "request" and insert -- request, --.

Column 15, lines 46-50, in Claim 25, delete "The method of claim 1, further comprising updating parametric information in a second state table associated with the selected on the second server, and communicating updated parametric information to the other servers among said plurality of servers." and insert -- The computer-readable medium of claim 16, further comprising computer-executable instructions for forwarding the third request to the second server. --.

Signed and Sealed this
Twenty-sixth Day of June, 2012

David J. Kappos
*Director of the United States Patent and Trademark Office*